US007743328B2

(12) United States Patent  (10) Patent No.: US 7,743,328 B2
Hilerio et al.  (45) Date of Patent:  Jun. 22, 2010

(54) PRESERVING A PROCESS INSTANCE FOR USE BY DIFFERENT USER INTERFACES

(75) Inventors: Israel Hilerio, Kenmore, WA (US); Shiqiu Guo, Sammamish, WA (US); Dharma Shukla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 11/549,022

(22) Filed: Oct. 12, 2006

(65) Prior Publication Data

US 2008/0148367 A1  Jun. 19, 2008

(51) Int. Cl.
G06F 3/00 (2006.01)
G06F 15/16 (2006.01)

(52) U.S. Cl. .................. 715/700; 715/748; 715/866; 709/219

(58) Field of Classification Search .......... 715/748
See application file for complete search history.

(56) References Cited

U.S. PATENT DOCUMENTS

| 6,061,695 | A | 5/2000 | Slivka et al. | |
|---|---|---|---|---|
| 6,502,234 | B1* | 12/2002 | Gauthier et al. | 717/107 |
| 6,772,137 | B1* | 8/2004 | Hurwood et al. | 707/2 |
| 6,833,847 | B1* | 12/2004 | Boegner et al. | 715/705 |
| 6,874,008 | B1* | 3/2005 | Eason et al. | 709/201 |
| 6,920,486 | B2* | 7/2005 | Kiiskinen | 709/214 |
| 6,996,800 | B2 | 2/2006 | Lucassen et al. | |
| 7,213,212 | B2* | 5/2007 | Bybee et al. | 715/760 |
| 7,216,351 | B1* | 5/2007 | Maes | 719/328 |
| 7,269,645 | B2* | 9/2007 | Goh et al. | 709/223 |
| 7,356,773 | B1* | 4/2008 | Barraclough | 715/762 |
| 7,386,805 | B2* | 6/2008 | Li | 715/781 |
| 2002/0194388 | A1 | 12/2002 | Boloker et al. | |
| 2003/0046448 | A1* | 3/2003 | Fischer et al. | 709/328 |

(Continued)

FOREIGN PATENT DOCUMENTS

WO  WO02091169 A1  11/2002

OTHER PUBLICATIONS

Introduction to Oracle ADF Applications, [online] copyright 2006 [retrieved on Sep. 5, 2006]. Retrieved from the Internet: URL: www.oracle.com/webapps/online-help/jdeveloper/10.1.3/state/content/navId.4/navSetId.\_/IvtAnchor.sm0002/vtTopicFile.bcadfdevguide%7Cintro~htm/.

(Continued)

*Primary Examiner*—Tadesse Hailu
*Assistant Examiner*—Nicholas S Ulrich
(74) *Attorney, Agent, or Firm*—Workman Nydegger

(57) ABSTRACT

A guided process framework includes a process engine, one or more data stores, and one or more user interfaces configured to communicate with the process engine. A user can access a given process instance through any appropriately configured user interface, which contacts the process engine, and which in turn contacts/consults definitions for one or more guided processes at a data store. If the user finishes only part of a given process instance, the process engine can save state corresponding to the progress in the data store. A user can continue work on the process instance through a different user interface (or at a different computer system) by contacting the process engine through the different user interface, and receiving rendering information configured for the different user interface. Thus, the user can stop and start work on a process however desired, and with whatever tools are available at any given time.

20 Claims, 4 Drawing Sheets

U.S. PATENT DOCUMENTS

| | | | |
|---|---|---|---|
| 2003/0055697 A1* | 3/2003 | Macken et al. | 705/7 |
| 2003/0067497 A1 | 4/2003 | Pichon | |
| 2003/0069716 A1* | 4/2003 | Martinez | 702/188 |
| 2003/0084104 A1* | 5/2003 | Salem et al. | 709/205 |
| 2003/0145305 A1 | 7/2003 | Ruggier | |
| 2004/0117209 A1* | 6/2004 | Brown | 705/2 |
| 2004/0117804 A1* | 6/2004 | Scahill et al. | 719/320 |
| 2004/0128613 A1* | 7/2004 | Sinisi | 715/500 |
| 2004/0225581 A1* | 11/2004 | Wyle et al. | 705/31 |
| 2005/0071853 A1 | 3/2005 | Jones et al. | |
| 2005/0076311 A1 | 4/2005 | Kusterer et al. | |
| 2005/0096968 A1* | 5/2005 | Goh et al. | 705/10 |
| 2005/0154741 A1* | 7/2005 | Hebert et al. | 707/100 |
| 2005/0257138 A1 | 11/2005 | Chory et al. | |
| 2006/0059422 A1* | 3/2006 | Wu et al. | 715/513 |
| 2006/0277287 A1* | 12/2006 | McCall et al. | 709/223 |
| 2007/0112829 A1* | 5/2007 | Sanabria et al. | 707/102 |
| 2007/0245223 A1* | 10/2007 | Siedzik et al. | 715/500.1 |

OTHER PUBLICATIONS

The Bull's-Eye: A Framework for Web Application User Interface Design Guidelines [online] [retrieved on Sep. 5, 2006]. Retrieved from the Internet: URL: http://delivery.acm.org/10.1145/650000/642697/p489-beier.pdf?key1=642697&key2=7271107511&coll=GUIDE&dl=GUIDE&CFID=1403742&CFTOKEN=36768744.

Building Desktop Applications with Web Services in a Message-based MVC Paradigm, [online] [retrieved on Sep. 5, 2006]. Retrieved from the Internet: URL: http://grids.ucs.indiana.edu/ptliupages/publications/ICWS04_BuildingDesktopApplicationwithWebServicesinaMessageBasedMVCParadigm.pdf#search=%22mvc%20%20desktop%20application%22.

* cited by examiner

US 7,743,328 B2

PRESERVING A PROCESS INSTANCE FOR USE BY DIFFERENT USER INTERFACES

CROSS-REFERENCE TO RELATED APPLICATIONS

N/A

BACKGROUND

Background and Relevant Art

As computerized systems have increased in popularity, so have the needs to create and manipulate documents, as well as complete electronic transactions or reports using computerized systems. Beyond just creating and completing documents, users also create and manipulate documents on more than one computer system. For example, users will often save a document at one stage, transport the document (e.g., via portable storage, internet transmission, etc.) to another computer system (e.g., home computer) and work toward a different stage of that document at that computer system. Accordingly, document portability (i.e., accessing/modifying documents on different computer systems) tends to be a fairly important concern for many users.

Such portability among different computer systems, however, tends to not to be available for other types of applications such as documents associated with electronic transactions initiated and completed as part of a guided process (also referred to as a "workflow," "process," or "business process"). In particular, most guided process-based applications follow a "wizard" style flow/format, in that they require the user to finish a number of steps in a particular sequence before the user exits the user interface or the computer system, or before saving progress. For example, a guided process application for online purchases might require a user to complete or execute one or more steps in a particular sequence, such as enter address information, credit card information, and the like, and then submit the entered information to a central hub for processing. In some cases, the sequence may be dictated by links embedded within the presented or displayed page, while in other cases, the page sequence may be dictated by coding in the specific guided process application that processes information received from the pages.

Similarly, a company might provide an internet/web-based guided process application for completing an expense report. To enter a set of expenses, a certain guided process application might require a user to login through a web browser, and then enter data into sets of web pages presented in a user interface in a particular sequence. As with the aforementioned purchasing scenario, the guided process might require the user to enter certain sequential information, such as name and date of the transaction(s) in one page, and the submitting party in another following page. In each of these examples, however, if the user were to exit the browser or user interface before completing and submitting all the pages, the user would typically need to start the purchasing process over at a later point. This is because the guided process application will generally not preserve the user's page progress in the transaction until certain steps are completed.

Although some guided process applications may be configured to save incremental progress by a user in an instance of the guided process, there is generally no common framework for doing so, particularly among user interfaces built on different technologies. In particular, each separate guided process that governs a particular wizard would need to be independently configured for saving progress. And these individual configurations would not apply to the next application or process running wizard-style documents in the system. Thus, one guided process application might be configured to save certain page progress at different steps in a process, while another one might not.

Thus, there is presently no way to take user progress in a particular process instance (i.e., instance of a guided process) using one user interface built on one type of technology (e.g., web-based user interface) and finish the process instance in another user interface based on another type of technology (e.g., a non-web, rich, or desktop style user interface). One reason for this is that, as previously mentioned, the particular user interface, rather than the overall framework, governs navigation between pages in the guided process. Such difficulties are becoming increasingly more acute since developers are tending more and more to keep navigation logic in the pages displayed in the user interface, rather than in a separate process definition.

Accordingly, there are a number of difficulties associated with managing page navigation and processing among different user interface technologies that can be addressed.

BRIEF SUMMARY

Implementations of the present invention provide systems, methods, and computer program products related to a framework for creating, processing, and porting process instances corresponding to a guided process among multiple types of user interface technologies. In at least one implementation, for example, a user can open one user interface that is built on one technology, and create a process instance of a particular guided process. The user can then close the user interface and finish that process instance through another user interface that is built on another technology. Accordingly, one will appreciate that the user interface technology used to render a process instance can be swapped midstream for another user interface technology.

For example, a method from the perspective of a user interface (or of a client computer system at which the user interface is installed) of facilitating progress in a guided process can involve sending, to a process engine, initial user input on a guided process through an initial user interface at a client computer system. The method can also involve, upon receiving a user login request through a different user interface, sending one or more requests to the process engine for any existing process instances associated with the user. In addition, the method can involve receiving from the process engine the identity of one or more existing process instances associated with the user, where at least one of the received process instance identities correspond to the initial user input on the guided process. Furthermore, the method can involve rendering the at least one process instance at the different user interface at the client computer system.

By contrast, a method from the perspective of a process engine for automatically preserving and supplying states of a user's process instance in a guided process can involve receiving one or more user inputs for a guided process from a first client computer system. The method can also involve passing state for a process instance corresponding to the guided process to a data store. In such a case, the data store will maintain at least a current state for the user's progress in the process instance. In addition, the method can involve receiving a user login request from a second client computer system for any available process instances associated with the user. Furthermore, the method can involve sending to the second client computer system rendering information for the process instance, where the process instance is based in part on the one or more user inputs received from the first client computer system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products related to a framework for creating, processing, and porting process instances corresponding to a guided process among multiple types of user interface technologies. In at least one implementation, for example, a user can open one user interface that is built on one technology, and create a process instance of a particular guided process. The user can then close the user interface and finish that process instance through another user interface that is built on another technology. Accordingly, one will appreciate that the user interface technology used to render a process instance can be swapped midstream for another user interface technology.

In general, and as will be appreciate from the following specification and claims, at least one implementation of the present invention comprises a framework (or a "page flow" framework) for efficiently navigating pages of a guided process using different user interface technologies. In one implementation, for example, one user interface may be based on a web-based technology (e.g., a web browser). In other cases, however, the user interface may be based on non-web-based technologies, such as rich, desktop style user interfaces based on client-installed word processing application programs (i.e., rich client user interface), etc.

One will appreciate that this approach of using a generic framework for executing guided processes (or instances thereof—i.e., process instances) can allow developers to separate guided process navigation from the corresponding user interface technologies, allowing the user interfaces to express page navigation inside a guided process as user interface workflows (i.e., the sequences dictated by the guided process definitions). As such, the guided process, rather than the user interfaces themselves, can control the navigation flow between guided process "pages," such as those built on an Active Server Page ("ASP"), INFOPATH forms, WINDOWS Presentation Framework ("WPF") environment, or navigation flow between user interface controls, such as "WINFORMS." One will appreciate, however, that reference herein to programs, frameworks, or components used within (or otherwise associated with) the MICROSOFT operating environment is made by way of convenience in description. In particular, one will appreciate that implementations of the present can be applied to a wide number of operating environments and technologies.

Figure 1A:
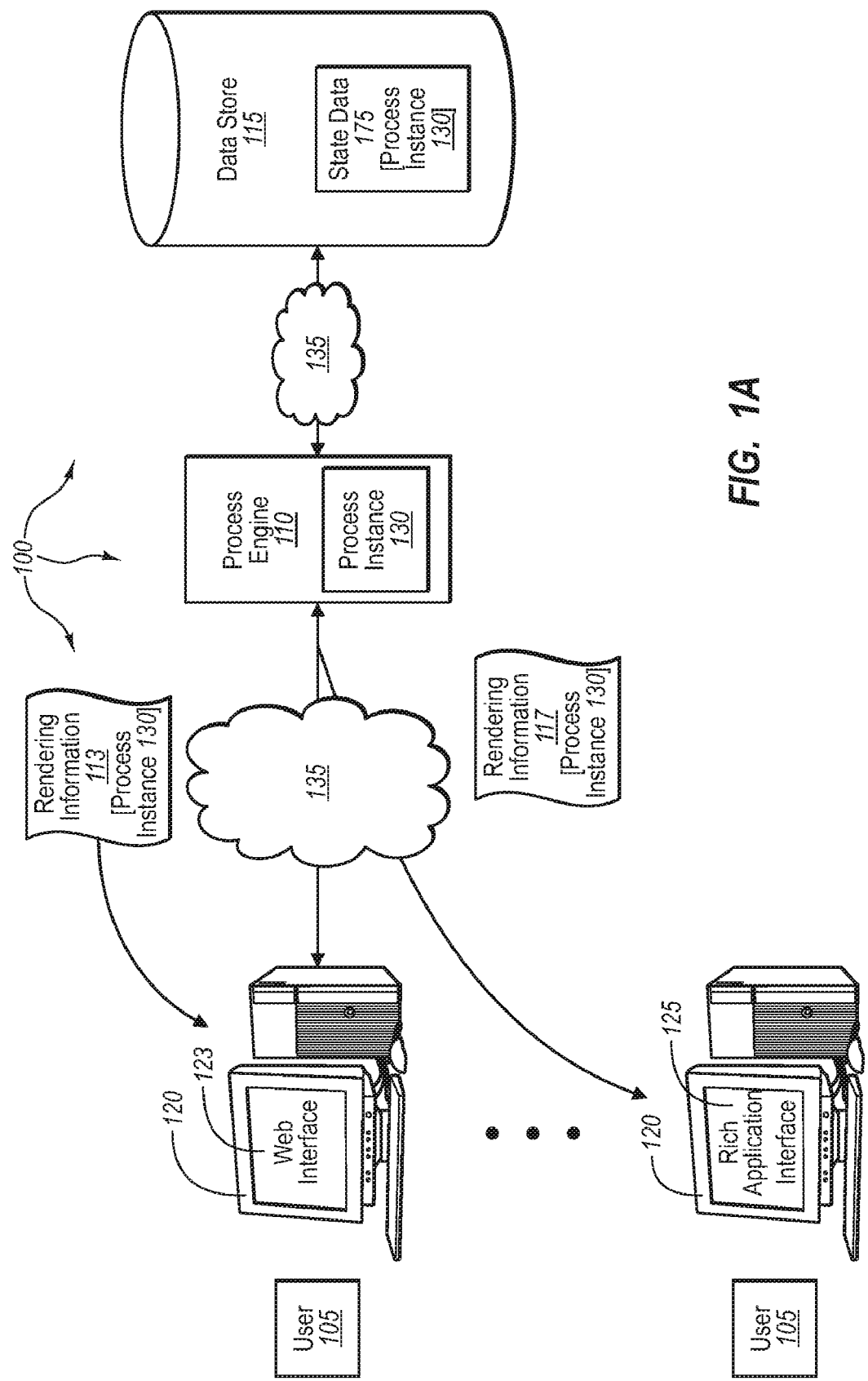
FIG. 1A illustrates an overview schematic diagram in accordance with an implementation of the present invention in which a user accesses a process instance through a web-based user interface and a rich, desktop style user interface.

For example, FIG. 1A illustrates an overview schematic diagram of a computerized system 100 in accordance with an implementation of the present invention. As shown, a user (e.g., 105) can initiate and/or otherwise access a process instance (e.g., 130) through a web-based user interface and/or through a rich application-based user interface, both installed at the same computer system (e.g., 120). In particular, FIG. 1A shows that user 105 accesses process instance 130 through web based interface 123, which obtains the information from process engine 110.

For example, user 105 opens an internet browser, and accesses a web (i.e. internet-based) application program through the browser, which further opens a web-based user interface (i.e., web interface 123). Web interface 123, in turn, is used to submit a report, or otherwise fill-in information as part of a guided process, (i.e., "workflow," or "business process," etc.) In so doing, web interface 123 of computer system 120 corresponds with process engine 110 to initiate or otherwise run a process instance (e.g., 130) for the guided process.

Figure 1B:
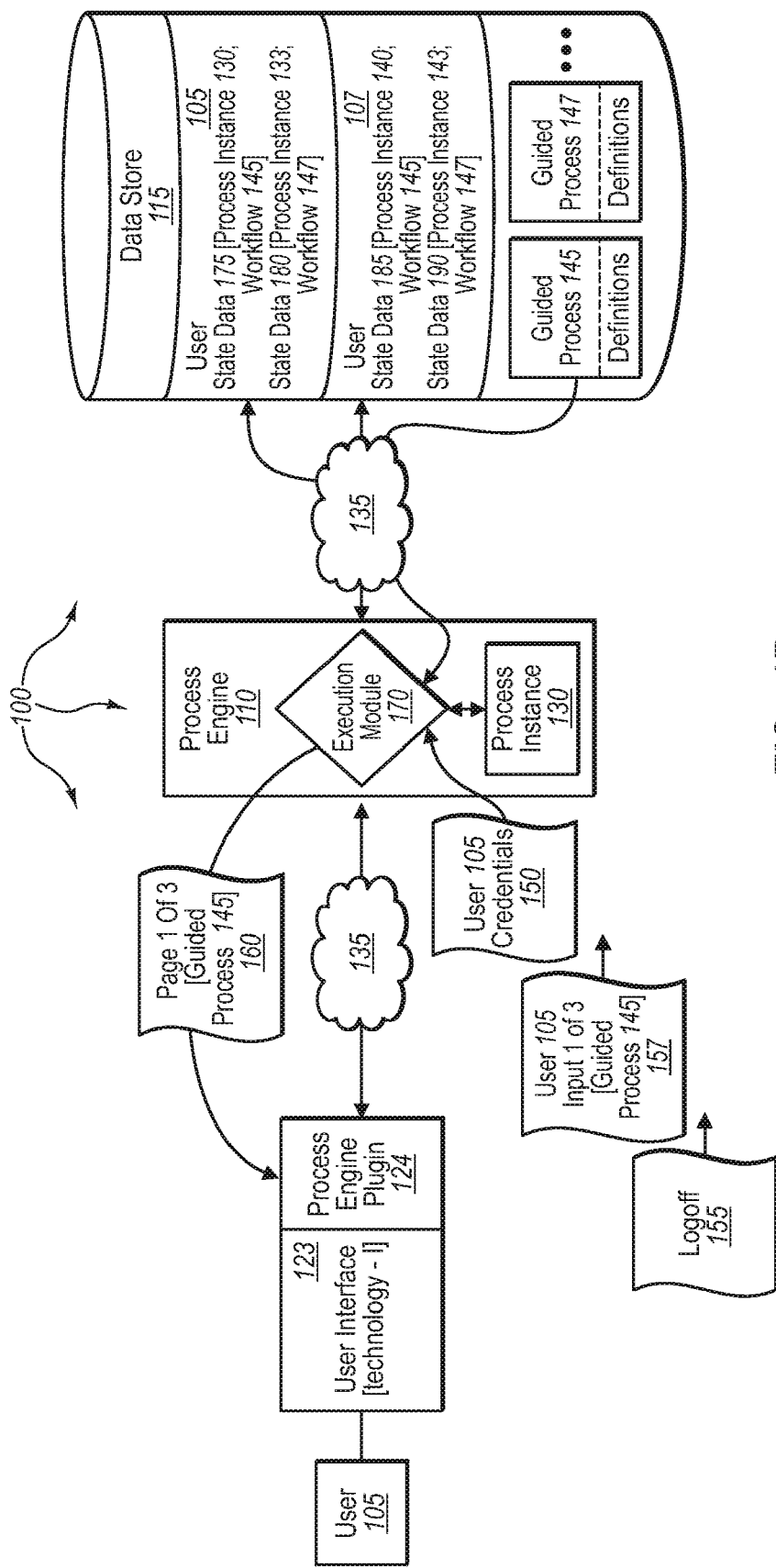
FIG. 1B illustrates a more detailed schematic diagram in accordance with an implementation of the present invention of the process illustrated in FIG. 1A, in which a user initiates work on process instance of a guided process through one type of user interface.
Figure 1C:
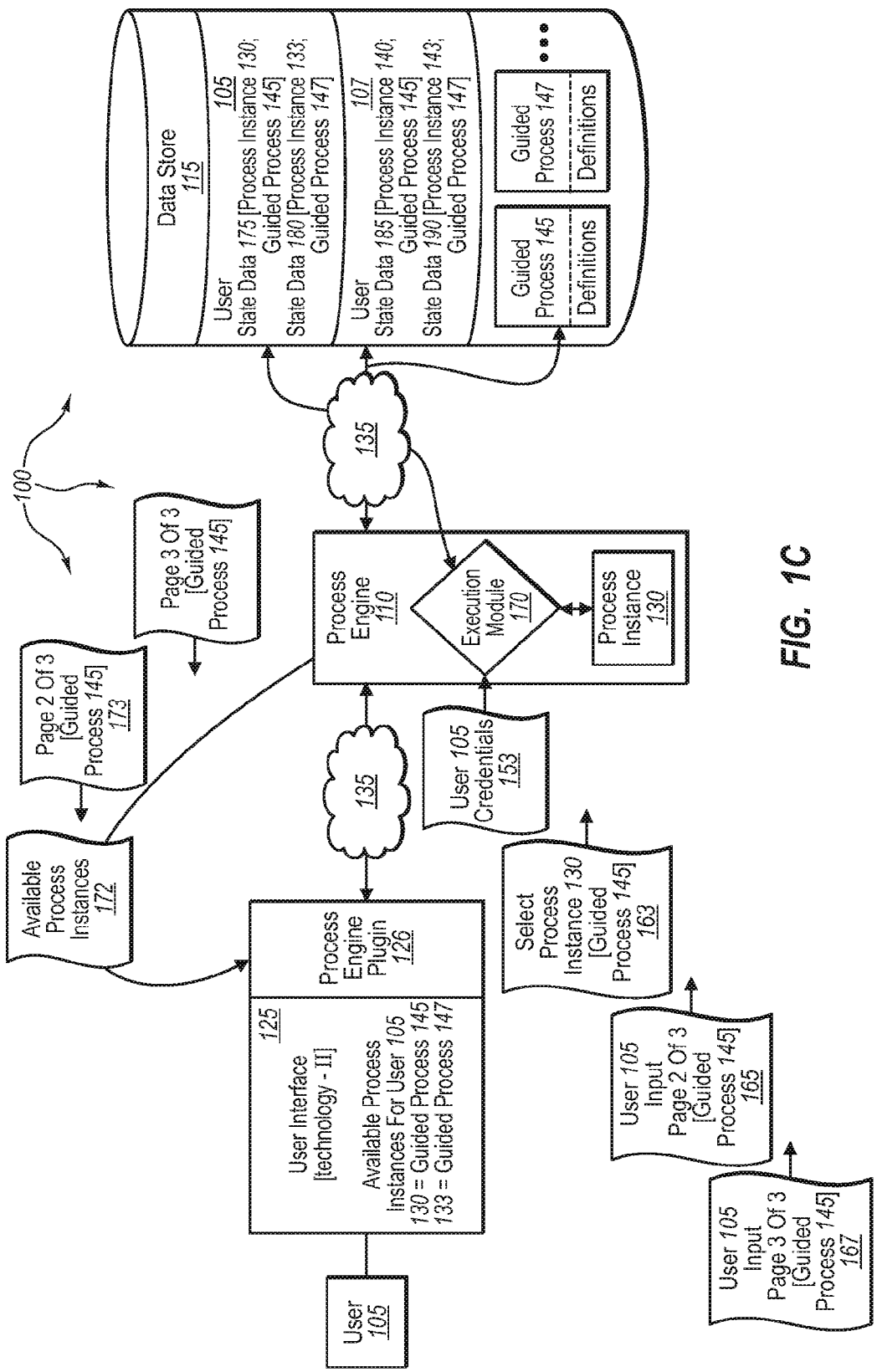
FIG. 1C illustrates a schematic diagram in accordance with an implementation of the present invention in which the user of FIGS. 1A and 1B continues to work on the process instance using a user interface built on a different technology.

As will be understood more fully herein, process engine 110 can include one or more runtime components that create, modify, and/or otherwise execute a particular process instance in accordance with a selected guided process definition (e.g., 145, 147, FIG. 1B-1C). When a user (e.g., via interface 123 or 125) at computer system 120 contacts process engine 110, process engine 110 combines information received from the user interface with data about the particular, requested guided process from data store 115. This can involve pulling and assembling certain guided process definitions to set up a new process instance (e.g., 130, also referred to as "workflow instance," or "application instance,") saving a process instance's state at data store 115 in response to a particular trigger point, as well as retrieving the state for a previously created process instance.

As used herein, a "process instance" (e.g., 130) is simply the user/session-specific execution of a guided process (e.g., 145, 147), and generally comprises the execution and rendering of a set of one or more wizard driven "pages" and/or corresponding data associated with a set of particular process definitions for the given guided process. One or more components or modules at process engine 110 execute and process the process instances.

FIG. 1A further shows that part of the execution performed by process engine 110 includes sending rendering information 113 for a process instance 130 to an appropriate web user interface 123. For example, FIG. 1A shows that process engine 110 can send rendering information 113, based on process instance 130, to web user interface 123. In general, rendering information 113 will include instructions tailored so that a specific user interface can display content in a particular way through a particular user interface, where the content is based on input and actions corresponding to a particular process instance.

In accordance with implementations of the present invention, process engine 110 can also provide rendering information for the same process instance to any number of other types of user interfaces, which may or may not be built on the same technology. For example, FIG. 1A shows that process engine 110 also sends rendering information 117 to a non-web-based, but otherwise "rich" client user interface 125. As used herein, a "rich client" user interface (e.g., 125) will generally be understood to include user interfaces associated with conventional word processing applications, spreadsheet applications, or another types of rich, desktop-style applications that are not ordinarily executed only through a web browser, as in the case of web interface 123.

FIG. 1B illustrates additional components, messages, and data that can be exchanged when working on or otherwise creating a process instance of a process within system 100. For example, FIG. 1B shows that user 105 uses user interface 123, which is built on "technology-I," to communicate with process engine 110. FIG. 1B also shows that user interface 123 communicates with process engine 110 via process engine plugin 124. In one implementation, plugin 124 provides an executable interface that allows user interface 123 to appropriately connect to and communicate within the framework of system 100, i.e. with process engine 110, including the ability to receive and understand response information (e.g., rendering information). One will appreciate that plugin 124 can be any type of plugin configured to be used by any user interface of an application program in a particular operating system, but will generally be a plugin specifically tailored for use by a particular user interface technology (e.g., "technology-I" in this case).

In any event, FIG. 1B illustrates a situation in which user 105 accesses user interface 123 to begin or continue working on a process instance of a guided process. In this particular example, user interface 123 passes user 105 credentials 150 to process engine 110. In general, message 150 can include any type of requests and credentials that will be understood by process engine 110 as a request by a user and/or user interface to work on a particular process. For example, and in addition to user credentials, message 150 can include a request for any available application instances, a request to work on a particular process (e.g., 145, 147), and can further include various connection information useful to identify user interface 123, such as cookie information, connection session information, or the like.

Upon receipt of message 150, execution module 170 at process engine 110 accesses the definitions associated with a particular guided process. For example, FIG. 1B shows that process engine 110 accesses the definitions for guided process 145 to create a new process instance thereof. In general, the process definitions include any appropriate computer-readable instructions regarding pages of a guided process (e.g., expense report pages in a sequence, etc.) to be rendered, the navigation of such pages, how certain responses (e.g., user input) should be handled or processed, and so on. Process engine 110 then combines the information of the requested guided process (e.g., 145/147) definitions with the received user/user interface information (e.g., 150) to create an instance, or "process instance," of the requested guided process.

For example, FIG. 1B shows that process engine 110 processes or otherwise executes and/or creates process instance 130 via execution module 170. Upon creating the particular process instance, or upon executing some subsequent input, process engine 110 then sends appropriate rendering information to the requesting user interface. For example, FIG. 1B shows that process engine 110 creates and sends rendering information in the form of message 160, which includes instructions regarding the rendering of the first page (i.e., page "1 of 3") in process 145. User 105 can then view the page as rendered by user interface 123 through a computer system (e.g., 120), and enter input as appropriate. For example, FIG. 1B shows that user interface 123 sends "input 1 of 3" corresponding to process 145 in a message 157.

As discussed herein, user 105 need not necessarily maintain the connection with process engine 110 through completion of a given guided process (or instance thereof). For example, FIG. 1B shows that user 105 sends one or more logoff messages 145, which suspends or pauses execution of application instance 130 mid-stream (i.e., before user 105 receives and responds to pages "2 of 3" and/or "3 of 3"). Alternatively, user 105 simply closes user interface 123, thereby terminating the network connection/connection session with process engine 110. In one implementation, upon receiving one or more appropriate termination signals (e.g., logoff message 145, termination of a connection session, etc.), process engine 110 saves the current state of the process instance in a data store (e.g., 115).

In general, data store 115 can comprise any number or type of remote (or even local) storage media and corresponding application programs for adequately and efficiently storing definitions corresponding to a guided process. For example, FIG. 1B shows that data store 115 is configured to store definitions for guided processes 145 and 147. One will appreciate, however, that such definitions are often not necessarily stored in data store 115. In one implementation, for example, a "definition" can be thought of as a class definition, such as a "C#" programming class. Thus, the definition(s) can be simply compiled from any appropriate location into an appropriate assembly (e.g., process instance 130).

Data store 115 can also be configured to store state data for multiple users, and the user's execution (via process engine 110) of multiple application instances. For example, FIG. 1B shows that data store 115 stores state data 175 and 180 for user 105, where state data 175 and 180 correspond to process instances 130 and 133, which are different instances of guided processes 145 and 147, respectively. Similarly, FIG. 1B shows that data store 115 also stores state data 185 and 190 for user 107, where state data 185 and 190 correspond to process instances 140 and 143 (also for guided processes 145 and 147, respectively).

One will appreciate that data store 115 can further include any application programs configured for management of the various application instance state and definitions of the guided processes stored thereon. In at least one implementation of the present invention, for example, data store 115 also includes one or more database programs installed thereon, and thus may serve as a database server, such as an SQL ("structured query language") database server. In such a case, process engine 110 may communicate with data store 115 (e.g., over network 135 if a remote data store) to identify existing process instances for a user by issuing one or more one or more database queries with an appropriate database interface of the installed database program(s).

At least in part since state data for any given application instance can be stored at data store 115, process engine 110 can also recreate any given application instance for user 105 at a later time, and through a different user interface, as needed. As discussed herein, this also can allow users to close their browser (or corresponding user interface) and restart the guided process from another browser at the same location. This can also allow users to close a process instance in a browser half-way through the process instance, and then restart the process instance inside another user interface (e.g., of a desktop application program—rich client user interface). The user could then navigate within the rich client user interface to a page that was previously executed in the browser.

For example, FIG. 1C illustrates an example in which the user of FIG. 1B continues work on a previously created process instance through a different user interface. In particular, FIG. 1C illustrates that user 105 has switched from a work computer to a home computer, or has switched user interfaces on the same or different computer system, and is thus ready to finish progress in a particular process. Accordingly, FIG. 1C shows that user 105 initiates user interface 125, which is different from user interface 123 at least in part since it is built on a different technology platform (i.e., "technology-II"), and may include a different plugin 126 for communicating with process engine 110.

The new or different user interface 125, in this case, then contacts process engine 110 over network 135 via one or more connection initiating messages (e.g., 153). One will appreciate, however, that process engine 110 need not necessarily be located over a network, and could actually be installed locally. Nevertheless, and as with message 150, message 153 can include user 105 credentials, a request to create a new process instance, and/or a specific request for available process instances associated with user 105. In addition, or in the alternative, the mere presentation of user 105 credentials in message 153 prompts process engine 110 to query data store 115 for available process instances for the user identified in message 153 (i.e., user 105).

However prompted, FIG. 1C shows that process engine 110 queries data store 115 and identifies that state for at least two process instances are stored for user 105, including state data 175 and 180. The corresponding process instances in this case, however, are for different processes 145 and 147, respectively. As such, FIG. 1C shows that process engine 110 sends rendering information in the form of message 172 to user interface 125, wherein message 172 includes an indication of the available application instances. Thus, FIG. 1C shows that user interface 125 renders message 172 to display information indicating that process instances 130 and 133 are available to user 105.

In this particular example, user 105 then selects an available process instance. Of course, user 105 could alternatively create a new process instance of the same or even a different guided process. In any event, FIG. 1C shows that user interface 125 sends message 163 to process engine 110, where message 163 includes instructions that process engine 110 execute a process instance associated with guided process 145 (e.g., via process instance 130). Upon receipt of message 163, process engine 110 uses execution module 170 to start (or re-start) a process instance corresponding to guided process 145, and further loads state data 175 from data store 115. Upon loading state data 175, the newly-created process instance 130 is essentially indistinct from what was previously created (e.g., in FIG. 1B).

Accordingly, process engine 110 sends additional rendering instructions with regard to the remaining pages for which process engine 110 has not yet received input. For example, FIG. 1C shows that process engine 110 sends rendering information via messages 173 and 177 for pages "2 of 3" and "3 of 3" respectively of guided process 145, while also receiving input messages 165 and 167 in response thereto. Process engine 110 then processes the remaining input, as appropriate, and submits the processed/executed process instance where dictated by the definitions of guided process. For example, the definitions of guided process 145 might have completion instructions that tell process engine 110 to send a completed application instance to a data store 115 queue, or a queue at a different computer system, for approval before submission to still a different location.

Accordingly, FIGS. 1A through 1C illustrate a number of schematics and components that can be used to preserving a user's progress in any given guided process. This allows the user to stop and continue work on a given process instance from virtually any appropriately-enabled user interface, and/or virtually any computer system that can communicate within system 100.

Figure 2:
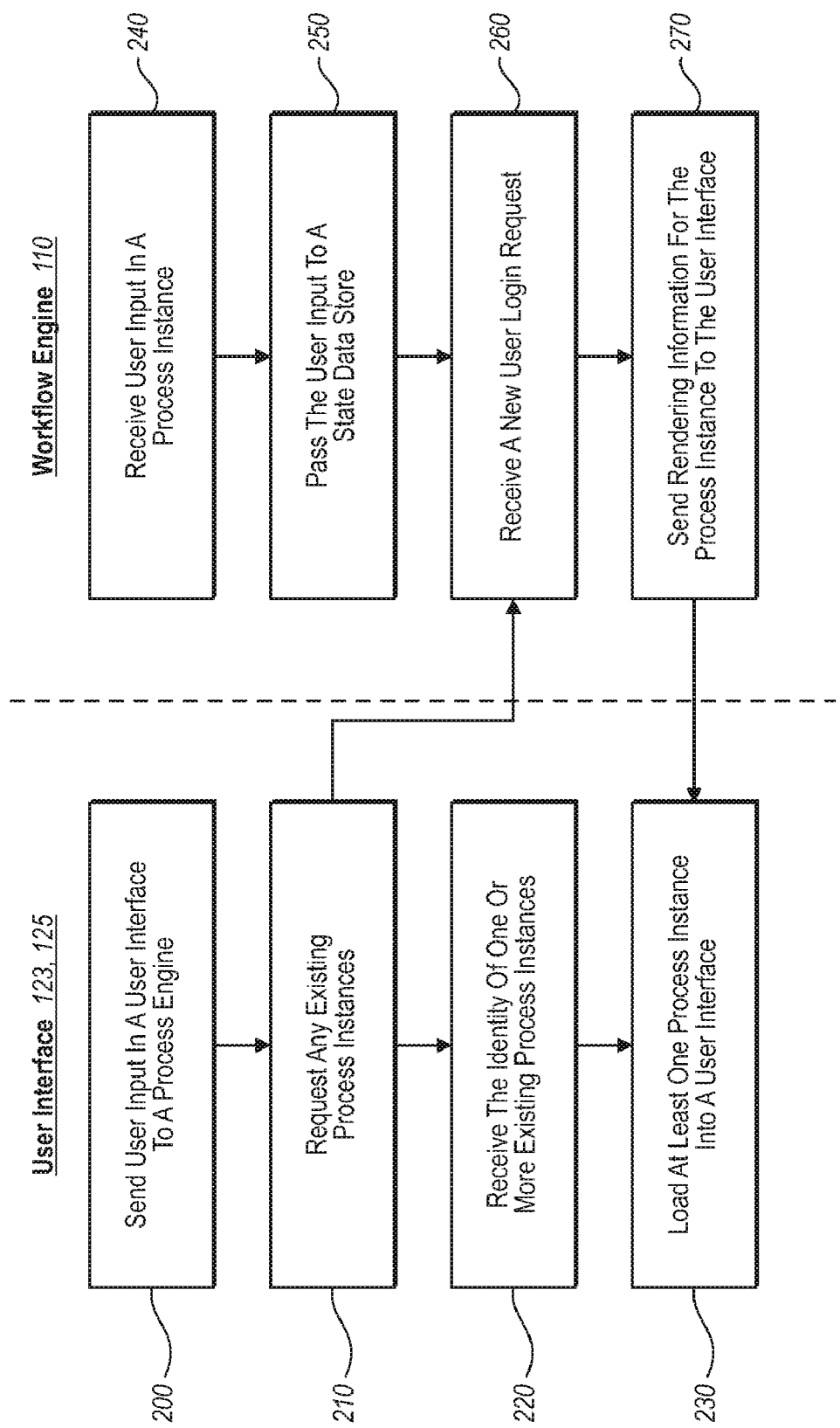
FIG. 2 illustrates flowcharts comprising a set of acts in a method from the perspective of a client computer system and of a process engine for working on a guided process from different computer systems and/or different user interfaces.

In addition to the foregoing, one will appreciate that implementations of the present invention can also be described in terms of flowcharts comprising a series of acts in a method of accomplishing a particular result. For example, FIG. 2 illustrates flowcharts comprising a set of acts in a method from the perspective of a client computer system and of a process engine for working on an application from different computer systems and/or different user interfaces. The acts of FIG. 2 are described below with respect to the components and diagrams of FIG. 1A-1C.

As a preliminary matter, reference herein to such terms as "initial," "subsequent," "first," or "second" are not intended to imply a particular sequence, unless otherwise noted. Rather, these terms generally refer to the first, initial, subsequent, or second times that a particular term (or like term) is introduced when intending to convey difference in terms, rather than specific order. That is, a "first" or "initial" computer system is merely different, or distinct, from a "subsequent" or "second" computer system. accordingly, the methods and claims described herein should not generally be limited to a particular order or sequence.

In any event, FIG. 2 shows that a method from the perspective of a user interface (e.g., 123 and/or 125, or computer system 120) of facilitating progress in a process through different user interfaces built on different technology, such that the user work on process using any of the different user interfaces comprises an act 200 of sending user input in a user interface to a process engine. Act 200 includes sending, to a process engine, initial user input on a guided process through an initial user interface at a client computer system. For example, FIGS. 1B and 1C show that user 105 enters credential information upon opening user interface 123 or 125. The corresponding user interface then prepares and sends one or more messages 150, 153 including this information to a process engine (e.g., 110).

FIG. 2 also shows that the method from the perspective of a user interface comprises an act 210 of requesting any existing process instances. Act 210 includes, upon receiving a user login request through a different user interface, sending one or more requests to the process engine for any existing process instances associated with the user. As shown in FIG. 1C, for example, user 105 uses user interface 125 to prepare and send one or more requests with message 153 (or in a separate message, not shown) for available process instances. In this particular example, user interface 125 is different from the user interface (i.e., 123) used to create at least one of the process instances in the first place. As previously mentioned, the mere sending of user credential information may prompt process engine 110 to search for existing process instances associated with the user.

In addition, FIG. 2 shows that the method from the perspective of a user interface comprises an act 220 of receiving the identity of one or more existing process instances. Act 220 includes receiving from the process engine the identity of one or more existing process instances associated with the user, wherein at least one of the received process instance identities corresponds to the initial user input on the process. For example, FIG. 1C shows that user interface 125 receives message 172, which includes instructions to render information indicating that process instances 130 and 133 are available to user 105.

FIG. 2 further shows that the method from the perspective of a user interface comprises an act 230 of loading at least one process instance into a user interface. Act 230 includes rendering the at least one process instance at the different user interface at the client computer system. For example, user interface 125, which is different from the user interface (i.e., 123) through which the user initially created process instance 130, receives interface-specific rendering information based on the user's prior progress on guided process 145. As such, user 105 is able to read displayed page data of messages 173 and 177, and send corresponding input messages 165 and 167 to complete the process, even though the user interfaces have changed (i.e., from interface 123 to interface 125).

By contrast, FIG. 2 shows that the method from the perspective of process engine 110 of automatically preserving and supplying states of a user's process instance in a process so that the user can stop and continue working on a particular guided process using a plurality of different user interfaces or at a plurality of different computer systems comprises an act 240 of receiving user input in an process instance. Act 240 includes receiving one or more user inputs for a guided process from a first client computer system. For example, process engine receives one or more messages 150 from user interface 123 to create an process instance of a guided process, and can further receive one or more messages 157 comprising user input (e.g., 157) in a particular guided process (e.g., 145).

FIG. 2 also shows that the method from the perspective of process engine 110 comprises an act 250 of passing the user input to a state data store. Act 250 includes passing state for an process instance of the process to a data store, wherein the data store maintains at least a current state for the user's progress in the process instance. For example, at any point along the user's progress in process instance 130 (e.g., FIG. 1B), or, upon receiving a termination message (e.g., logoff 155) from user interface 123, process engine 110 passes state associated with the user's progress to state data store 115.

In addition, FIG. 2 shows that the method from the perspective of process engine 110 comprises an act 260 of receiving a new user login request. Act 260 includes receiving a user login request from a second client computer system for any available process instances associated with the user. For example, process engine 110 receives one or more messages 153 from user interface 125 to work on a process instance. In this particular example, the user interface used to finish the process instance (e.g., user interface 125) is a different interface from the user interface originally used to create the process instances (e.g., 123).

Furthermore, FIG. 2 shows that the method from the perspective of process engine 110 comprises an act 270 of sending rendering information for the process instance to the user interface. Act 270 includes sending to the second client computer system rendering information for the process instance of the process, wherein the process instance is based in part on the one or more user inputs received from the first client computer system (or first user interface). For example, FIG. 1C shows that process engine 110 prepares and sends rendering information (e.g., messages 173, 177) corresponding to work not yet completed (i.e., pages to be filled out) by the user when previously working via a prior computer system or prior user interface (e.g., 123).

Accordingly, FIGS. 1A-2 provide a number of components, mechanisms, and methods involving a generic framework, which includes a navigation model that can be used to drive rich client navigation, as well as web client navigation simultaneously. In particular, the above-described text and Figures describe a framework configured to support the ability to use the same model to drive many user interface technologies simultaneously. That is, part of a guided process can be executed through one user interface technology, while another part of the guided process can be executed through another, different user interface technology.

While the foregoing text describes the present invention in terms of schematics and component architecture, the following further illustrates some specific components and sample program code that may be used within at least one type of operating environment, such as the MICROSOFT operating environment. In one such environment with particular respect to "workflows," the concepts in accordance with the present invention may be divided into several sub-areas, including "UI Workflow Hosting," "UI Workflow Modeling," "UI Workflow Designers," and "UI Controls."

For example, "UI Workflow Hosting" can be understood in one implementation as reference to the machinery required to execute the predefined page flows in a workflow process. This infrastructure, in turn, can be leveraged by the various user interface applications (e.g., 123, 125) to manage the various application/workflow instances of a particular workflow. The various user interface technologies (i.e., "Technology-I," "Technology-II") can, in turn, be configured to leverage the functionality (e.g., via plugins 124, 126) provided by "UI Workflow Hosting" to interact with the process engine and definitions.

In addition, and in at least one implementation, "UI Workflow Modeling" references the infrastructure/APIs (application program interfaces) used to define workflows (e.g., guided processes), which, in turn control the navigation within a user interface. Furthermore, "UI Controls" can be understood as referencing the abstraction layer used by the UI applications to hide the Workflow framework from a user interface developer. The following text illustrates example program code that can be used with at least some of the aforementioned terms and definitions, and further in accordance with the general concepts described herein.

In particular, the following Example 1 illustrates sample code that can be used in an ASP framework, as well as a WINDOWS PRESENTATION FRAMEWORK ("WFP") for starting a workflow runtime (e.g., at process engine 110).

Example 1

```
ASP.NET

Global.asax
void Application_Start(object sender, EventArgs e)
{
Workflow.UI.NavigationManager navigationManager = new
Workflow.UI.NavigationManager( );
    //Store the NavigationManager in the Application State to be used
at a later time
this.Application["NavigationManager"] = navigationManager;
    //Configure the persistence service to allow the workflow to be
durable across multiple HTTP Sessions
navigationManager.AddService (new
System.Workflow.Runtime.Hosting.-
SqlWorkflowPersistenceService("Initial
Catalog=ASPPersistence;Data Source=localhost;Integrated
Security=SSPI;", true, TimeSpan.MaxValue, TimeSpan.MinValue));
}
```

```
WPF

MyApp.xaml.cs
protected override void OnStartup(StartupEventArgs e)
{
Workflow.UI.NavigationManager navigationManager = new
Workflow.UI.NavigationManager( );
    //Configure the persistence service to allow the workflow to be
durable across multiple HTTP Sessions
navigationManager.AddService (new
System.Workflow.Runtime.Hosting.-
SqlWorkflowPersistenceService("Initial
Catalog=ASPPersistence;Data Source=localhost;Integrated
Security=SSPI;", true, TimeSpan.MaxValue, TimeSpan.MinValue));
}
```

The following Example 2 illustrates sample code that can be used in an ASP framework, as well as a WPF for starting an application—or process—instance (e.g., at process engine 110).

Example 2

```
ASP

Default.aspx.cs
Protected void StartWorkflow(object sender, EventArgs e)
{
    //Access the NavigationManager Class
NavigationManager navigationManager = (NavigationManager)
this.Application ["NavigationManager"];
    //Create and Run Workflow Instance
Guid workflowID = navigationManager.CreateWorkflow
(typeof (Workflow1));
navigationManager.Start(workflowID);
    // Store the instance id for later retrieval of the workflow instance
this.Context.Session["WorkflowInstance"] = workflowID;
}
```

```
WPF

Page.xaml.cs
void StartWorkflow(object sender, RoutedEventArgs e)
{
    //Access the Navigation Manager Class
NavigationManager navigationManager = MyApp.NavigationManager;
    //Create and Run Workflow Instance
Guid workflowId = navigationManager.CreateWorkflow
(typeof(Workflow1)));
navigationManager.Start(workflowID);
    //Store the instance id for later retrieval of the workflow instance
Clipboard.SetDataObject(workflowID.ToString( ));
}
```

The following Example 3 illustrates sample code that can be used in an ASP framework, as well as a WPF for requesting navigation information (e.g., at process engine 110).

Example 3

```
ASP

Default.aspx.cs
void Navigate(string currentPageName, WorkflowReference workflowRef)
{
    // Retrieve NavigationManager and workflow instance ID
    ...
    // Query for the current page.
    InteractionContext interactionContext =
navigationManager.GetCurrentcontext(workflowID);
    // Redirect to the current page as dictated by the workflow.
    this.Response.Redirection(interactionContext.Bookmark);
}
```

```
WPF

Page.xaml.cs
void Navigate(string currentPageName, WorkflowReference workflowRef)
{
    // Retrieve NavigationManager and workflow instance ID
    ...
    // Query for the current page.
    InteractionContext interactionContext =
navigationManager.GetCurrentContext(workflowID));
    // Navigate to the current page as dictated by the workflow.
    this.NavigationService.Navigate(interactionContext.Bookmark);
}
```

The following Example 4 illustrates sample code that can be used in an ASP framework, as well as a WPF for getting data from the process (e.g., 145, 147 at Data Store 115).

Example 4

```
ASP

Default2.aspx.cs
protected void Page_Load(object sender, EventArgs e)
{
    // Retrieve NavigationManager and workflow instance ID
    ...
    // Query for the current page context.
    InteractionContext interactionContext =
navigationManager.GetCurrentContext(workflowID);
    // Display data for the current page.
    Employee employeeData =
    (Employee)interactionContext.ActivityOutputData;
    This.firstNameField.Text = employeeData.FirstName;
}
```

```
WPF

Page.xaml.cs
protected override void OnInitialized(EventArgs e)
{
    base.OnInitialized(e);
    // Retrieve NavigationManager and workflow instance ID
    ...
    // Query for the current page context.
    navigationManager.GetCurrentContext(workflowID);
    // Display data for the current page.
    Employee employeeData =
    (Employee)interactionContext.ActivityOutputData;
    This.firstNameField.Text = employeeData.FirstName;
}
```

The following Example 5 illustrates sample code that can be used in an ASP framework, as well as a WPF for setting data in—and submitting data to—the process (e.g., 145, 147 at Data Store 115).

Example 5

| ASP |
|---|
| Default2.aspx.cs<br>void Navigate(string currentPageName, WorkflowReference workflowRef)<br>{<br>    // Retrieve NavigationManager and workflow instance ID<br>    ...<br>    // Submit data to the workflow and move to the next page as dictated by the workflow after it processes the user input data.<br>    InteractionContext interactionContext = navigationManager.GoForward(workflowID, this.firstNameField.Text);<br>    // Navigate to the next page.<br>    this.Response.Redirect(interactionContext.Bookmark);<br>} |

| WPF |
|---|
| Page.xaml.cs<br>Void Navigate(string currentPageName, WorkflowReference workflowRef)<br>{<br>    // Retrieve NavigationManager and workflow instance ID<br>    ...<br>    // Submit data to the workflow and move to the next page as dictated by the workflow after it processes the user input data.<br>    InteractionContext interactionContext = navigationManager.GoForward(workflowID, this.firstNameField.Text);<br>    // Navigate to the next page.<br>    this.NavigationService.Navigate(interactionContext.Bookmark);<br>} |

One will appreciate that there are a number of ways in which implementations of the present invention can provide a unified environment for a large number (if not all) user interface technologies (whether web and non-web UI applications). In particular, there are a number of ways, both from code, schematic, and architectural perspectives in which implementations of the present invention provide a common navigation definition, which can be leveraged by multiple UI technologies for the same guided process (or instance thereof), and further allow for sharing of application instances between multiple user interface (or other types of rendering) technologies.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. In particular, user interface technologies can be expanded to any types of technologies that involve user interaction, such as phone systems, voice activated devices, etc. The described embodiments are thus to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a client computer system in a computerized environment that includes a process engine for executing process instances associated with corresponding one or more guided processes, one or more remote data stores, and one or more user interfaces built on corresponding different technology, a method of facilitating progress in a process instance through different user interfaces built on different technology, such that the user can work on the process instance using any of the different user interfaces, comprising the acts of:

sending, to a process engine, initial user input on a process instance of a guided process through an initial user interface at a client computer system;

receiving initial rendering information for the at least one process instance from the process engine, wherein the initial rendering information is formatted for a technology platform of the initial user interface;

upon receiving a user login request through a different user interface, sending one or more requests to the process engine for any existing process instances associated with the user;

receiving from the process engine the identity of one or more existing process instances associated with the user, wherein at least one of the received process instance identities corresponds to the initial user input on the process instance;

receiving different rendering information formatted for a technology platform of the different user interface; and rendering the at least one process instance at the different user interface at the client computer system.

2. The method as recited in claim 1, wherein one of the initial user interface or the different user interface is built on a web-based user interface technology, and wherein the other of the initial or different user interfaces is built on a rich, desktop style user interface technology.

3. The method as recited in claim 1, wherein the process engine is remote of the client computer system.

4. The method as recited in claim 1, further comprising an act of terminating a connection with the process engine.

5. The method as recited in claim 4, wherein terminating the connection further comprises an act of sending one or more logoff requests to the process engine after sending the initial user input on the process.

6. The method as recited in claim 4, wherein the one or more requests for any existing process instances comprise anyone or more of user credentials, cookie information, and connection session information for the different user interface.

7. The method as recited in claim 1, further comprising an act of sending one or more messages from the different user interface to the process engine that indicates a selection for one of the one or more existing process instances.

8. The method as recited in claim 1, wherein the format of the rendering information received for the different user interface is different from a format of rendering information previously received for the initial user interface.

9. At a process engine in a computerized environment that includes one or more client user interfaces and one or more remote data stores, a method of automatically preserving and supplying states of a user's process instance in a guided process so that the user can stop and continue working on a process instance using a plurality of different user interfaces or at a plurality of different computer systems, comprising the acts of:

receiving one or more user inputs for a particular guided process from a first client computer system;

passing state for an process instance of the guided process to a data store, wherein the data store maintains at least a current state for the user's progress in the process instance;

receiving a user login request from a second client computer system for any available process instances associated with the user for any guided processes; and sending to the second client computer system rendering information for the process instance of the particular guided process, wherein the process instance is based in part on the one or more user inputs received from the first client computer system and;

sending second rendering information to the second client computer system based on the user progress in the process instance of the particular guided process, wherein the first rendering information is formatted for one user interface technology, and wherein the second rendering information is formatted for a different user interface technology.

10. The method as recited in claim 9, further comprising an act of creating the process instance for the guided process in response to the one or more user inputs from the first client computer system.

11. The method as recited in claim 10, wherein the act of creating the process instance further comprises identifying user credentials in the received one or more user inputs and comparing the identified user credentials with one or more requested guided process.

12. The method as recited in claim 9, further comprising an act of sending first rendering information to the first client computer system, wherein the first rendering information corresponds to user progress in the process instance of the particular guided process.

13. The method as recited in claim 9, wherein the first rendering information is formatted for a user interface of a web-based user interface, and the second rendering information is formatted for a user interface of a non-web-based, rich user interface.

14. The method as recited in claim 9, further comprising an act of identifying that a connection with the first computer system has been terminated.

15. The method as recited in claim 14, wherein the act of passing state to the data store occurs after identifying that the connection with the first computer system has been terminated.

16. At a process engine in a computerized environment that includes one or more client user interfaces and one or more remote data stores, a computer program product having computer-executable instructions stored thereon that, when executed, cause one or more processors at the process engine to perform a method comprising:

receiving one or more user inputs for a particular guided process from a first client computer system;

passing state for an process instance of the guided process to a data store, wherein the data store maintains at least a current state for the user's progress in the process instance;

receiving a user login request from a second client computer system for any available process instances associated with the user for any guided processes; and sending to the second client computer system rendering information for the process instance of the particular guided process, wherein the process instance is based in part on the one or more user inputs received from the first client computer system and sending second rendering information to the second client computer system based on the user progress in the process instance of the particular guided process, wherein the first rendering information is formatted for one user interface technology, and wherein the second rendering information is formatted for a different user interface technology.

17. The computer program product as recited in claim 16, further comprising creating the process instance for the guided process in response to the one or more user inputs from the first client computer system.

18. The computer program product as recited in claim 17, wherein creating the process instance further comprises identifying user credentials in the received one or more user inputs and comparing the identified user credentials with one or more requested guided process.

19. The computer program product as recited in claim 16, further comprising sending first rendering information to the first client computer system, wherein the first rendering information corresponds to user progress in the process instance of the particular guided process.

20. The computer program product as recited in claim 16, wherein the first rendering information is formatted for a user interface of a web-based user interface, and the second rendering information is formatted for a user interface of a non-web-based, rich user interface.

* * * * *